United States Patent
Chia

(10) Patent No.: US 8,115,755 B2
(45) Date of Patent: Feb. 14, 2012

(54) REDUCING POWER CONSUMPTION ASSOCIATED WITH HIGH BIAS CURRENTS IN SYSTEMS THAT DRIVE OR OTHERWISE CONTROL DISPLAYS

(75) Inventor: Chor-Yin Chia, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 855 days.

(21) Appl. No.: 11/609,853

(22) Filed: Dec. 12, 2006

(65) Prior Publication Data

US 2008/0079706 A1 Apr. 3, 2008

Related U.S. Application Data

(60) Provisional application No. 60/847,858, filed on Sep. 28, 2006.

(51) Int. Cl.
*G06F 3/038* (2006.01)
*G09G 5/00* (2006.01)
(52) U.S. Cl. ...................................................... 345/211
(58) Field of Classification Search .................... 345/98, 345/100, 204, 211–213
See application file for complete search history.

(56) References Cited

U.S. PATENT DOCUMENTS

| | | | |
|---|---|---|---|
| 5,335,168 A | 8/1994 | Walker | |
| 5,844,532 A | 12/1998 | Silverbrook et al. | |
| 5,944,830 A | 8/1999 | Hong et al. | |
| 6,154,121 A | 11/2000 | Cairns et al. | |
| 6,353,224 B1 | 3/2002 | Sinclair et al. | |
| 6,437,716 B2 | 8/2002 | Nakao | |
| 6,496,175 B1 * | 12/2002 | Fukuo | 345/99 |
| 6,593,934 B1 | 7/2003 | Liaw et al. | |
| 6,600,483 B1 * | 7/2003 | Akita et al. | 345/204 |
| 6,781,532 B2 | 8/2004 | Wei | |
| 6,801,178 B2 | 10/2004 | Nitta et al. | |
| 6,836,232 B2 | 12/2004 | Bu | |

(Continued)

FOREIGN PATENT DOCUMENTS

EP 0651367 A1 3/1995

(Continued)

OTHER PUBLICATIONS

"Analog Devices: 10-Channel Gamma Buffer with Vcom Driver,"ADD8710, Analog Devices, Inc.(2004), http://www.analog.com/UploadedFiles/Data_Sheets/136071332ADD8710_a.pdf.

(Continued)

*Primary Examiner* — Chanh Nguyen
*Assistant Examiner* — Sanghyuk Park
(74) *Attorney, Agent, or Firm* — Fliesler Meyer LLP

(57) ABSTRACT

Provided herein are methods and configurations for use with systems that drive or otherwise control displays (e.g., LCD displays). Such systems often include devices (e.g., buffers, DACs, ADCs, etc.) that require a sufficiently high bias current to enable the device to have a sufficiently fast slew rate and settling time, which may consume an undesirable high amount of power. Embodiments of the present invention adjust such bias current to reduce power consumption. A first bias current level is provided to the device when an input to, and a corresponding output from, the device are to transition from one level to another. A second bias current level is provided to the device when the input to, and the corresponding output from, the device are not to transition from one level to another, where the second bias current level is lower than the first bias current level.

29 Claims, 8 Drawing Sheets

U.S. PATENT DOCUMENTS

| | | | |
|---|---|---|---|
| 6,879,310 | B2 | 4/2005 | Nose |
| 6,897,800 | B2 | 5/2005 | Chia |
| 6,943,780 | B1* | 9/2005 | Van Dijk .................. 345/204 |
| 6,950,045 | B2 | 9/2005 | Kim |
| 6,961,015 | B2 | 11/2005 | Kernahan et al. |
| 7,110,009 | B2 | 9/2006 | Ooishi et al. |
| 7,126,596 | B1* | 10/2006 | Hogan ..................... 345/211 |
| 7,317,440 | B2* | 1/2008 | Chung ..................... 345/89 |
| 2003/0043129 | A1* | 3/2003 | Tazuke ..................... 345/204 |
| 2003/0095118 | A1* | 5/2003 | Kato ..................... 345/213 |
| 2006/0071928 | A1* | 4/2006 | Morita ..................... 345/211 |

FOREIGN PATENT DOCUMENTS

JP  07121137  12/1995

OTHER PUBLICATIONS

"Temperature Compensating Gamma Trimster ATT3209," Alta Analog, Inc. (2004), http://www.alta-analog.com/Speciications/ATT3209.pdf.

"Gamma Trimster AGT1809," Alta Analog, Inc. (2004), http://www.alta-analog.com/Speciications/AGT1809.pdf.

Harrison, et al., "A CMOS Programmable Analog Memory Cell Array Using Floating-Gate Circuits," IEEE Transactions on Circuits and Systems, vol. 48(1); pp. 4-11, (Feb. 2001), http://www.ece.utah.edu/~harrison/papers/TCASII2001.pdf.

International Search Report for International Application No. PCT/US2007/077595.

* cited by examiner

REDUCING POWER CONSUMPTION ASSOCIATED WITH HIGH BIAS CURRENTS IN SYSTEMS THAT DRIVE OR OTHERWISE CONTROL DISPLAYS

PRIORITY CLAIM

This application claims priority under 35 U.S.C. 119(e) to U.S. Provisional Patent Application No. 60/847,858, filed Sep. 28, 2006, which is incorporated herein by reference.

FIELD OF THE INVENTION

Embodiments of the present invention relate to the field of integrated circuits, and more specifically to reference voltage generators, column drivers, and other devices that are useful in display (e.g., LCD) applications.

BACKGROUND

A potential issue with systems that drive or otherwise control displays (e.g., LCD displays) is that providing a sufficiently high bias current to enable a device (e.g., buffer) of the system to have a sufficiently fast slew rate and settling time may consume an undesirable high amount of power. This is especially a problem with battery powered portable devices, where there is a desire to minimize power consumption, to thereby maximize the time between battery re-charges or battery replacements. There is a desire to reduce power consumption due to such bias currents.

SUMMARY

Specific embodiments of the present invention reduce the power consumption due to bias currents that are used to enable devices (e.g., buffer, digital-to-analog converter, an analog-to-digital converter, voltage-to-current converter, current-to-voltage converter, etc.) to have sufficiently fast slew rates and settling times, where such devices are used to drive or otherwise control displays.

Embodiments of the present invention take advantage of the realization that fast slew rates and settling times are important when the output of a device (e.g., buffer, digital-to-analog converter, an analog-to-digital converter, voltage-to-current converter, current-to-voltage converter, etc.) is transitioning from one state to another (e.g., one voltage to another), but not necessarily important when there is no such transitioning. More specifically, in accordance with specific embodiments of the present invention, the bias current provided to the device is increased when the input to, and thus the corresponding output from, the device are to transition from one level to another, and the bias current provided to the device is reduced when the input to, and thus the corresponding output from, the device is not transitioning. Stated another way, a relatively high bias current ($Ibias_H$) is used when the output of the device is transitioning, and a relatively low bias current ($Ibias_L$) is used when the output of the device is not transitioning, where $Ibias_H = M*Ibias_L$ (e.g., M=4).

More generally, in accordance with an embodiment, a first bias current level is provided to the device when an input to, and a corresponding output from, the device are to transition from one level to another; and a second bias current level is provided to the device when the input to, and the corresponding output from, the device are not to transition from one level to another (e.g., after a transition is complete), the second bias current level being lower than the first bias current level. In a specific embodiment, whenever the bias current provided to the device is to be lowered from the first bias current level to the second bias current level, a further bias current level is provide for a short period of time to the device, where the further bias current level is lower than the first bias current level but higher than the second bias current level. This further or intermediate bias current level is useful for helping with the settling of nodes within the device. Even more bias current levels can also be produced and used, if desired.

In accordance with an embodiment, a control signal (e.g., a bank select signal, but not limited thereto) specifies when the input to the device is to transition from one level to another level. In accordance with an embodiment, such a control signal is provided to an input of a one-shot, to thereby produce a one-shot pulsed signal, at an output of the one shot. The one-shot pulsed signal includes a pulse having a leading edge that generally coincides with the input to the device transitioning from one level to another and a trailing edge that occurs a delay after the leading edge, where the delay is defined by the one-shot. The one-shot pulsed signal is used to specify when the bias current provided to the device is to have the first bias current level, and to specify when the bias current provided to the device is to have the second bias current level. Additional one-shots can be used to produce further bias current levels.

Further embodiments, and the features, aspects, and advantages of the present invention will become more apparent from the detailed description set forth below, the drawings and the claims.

DETAILED DESCRIPTION

In conventional flat panel display systems, such as liquid crystal display (LCD) systems, the brightness of each pixel or element is controlled by a transistor. An active matrix display includes a grid of transistors (e.g., thin film transistors) arranged in rows and columns. A column line is coupled to a drain or a source associated with each transistor in each column. A row line is coupled to each gate associated with the transistors in each row. A row of transistors is activated by providing a gate control signal to the row line which turns on each transistor in the row. Each activated transistor in the row then receives an analog voltage value from its column line to cause it to emit a particular amount of light. Generally speaking, a column driver circuit provides the analog voltage to the column lines so that the appropriate amount of light is emitted by each pixel or element. The resolution of a display is related to the number of distinct brightness levels. For a high quality display, a multi-reference voltage generator (e.g., eight or more voltages) is needed to supply voltages to the column driver.

Figure 1:
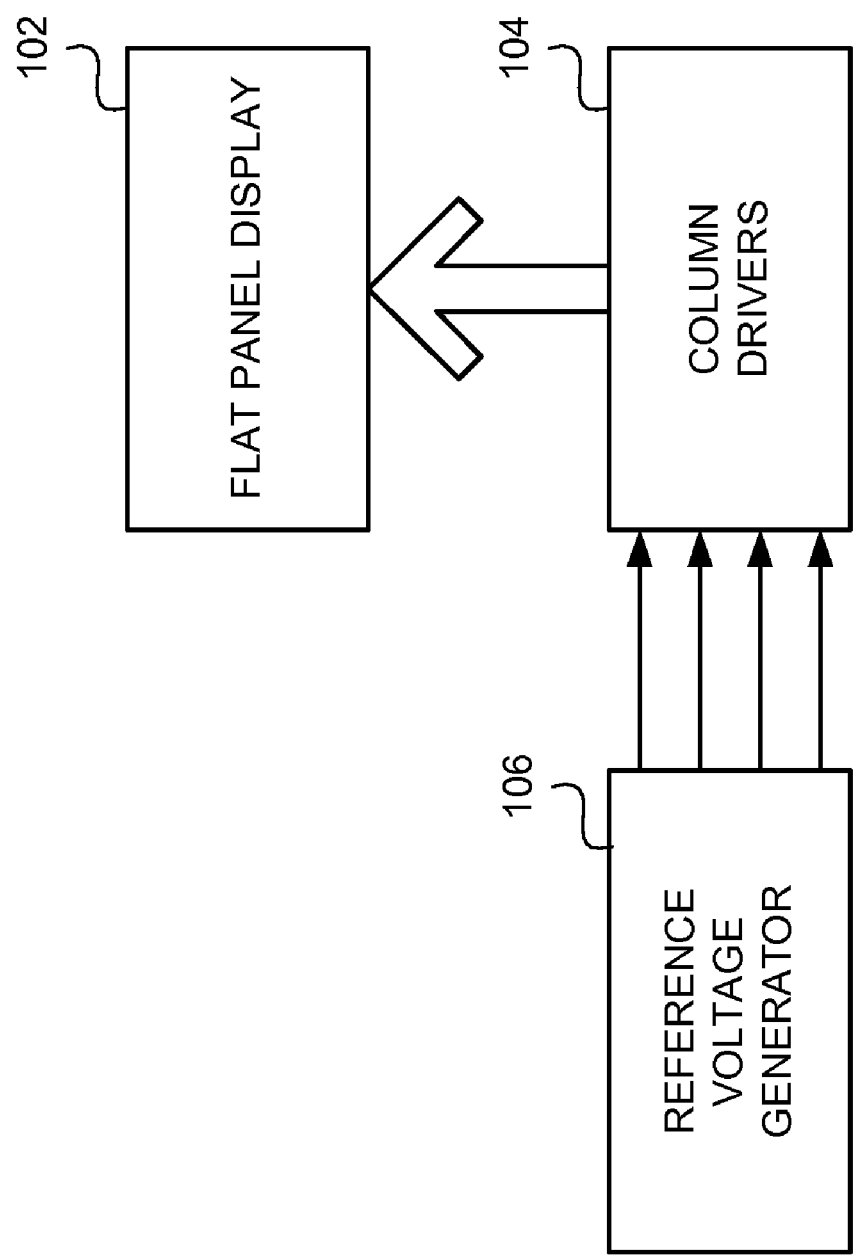
FIG. 1 is a high level block diagram showing an LCD display along with portions of its driver circuitry.

FIG. 1 shows an LCD display 102 along with portions of its driver circuitry, including column driver(s) 104, and a multi-reference voltage generator 106, which provides analog voltages to the column driver(s) 104. Although FIG. 1 shows the driver circuitry logically separate from the display 102, commercial displays may combine the display and the driver circuitry into a single thin package. Therefore, a major consideration in developing circuitry for such displays is the microchip die size required to implement the driver circuitry. Cost is also a factor to be taken into account.

Figure 2:
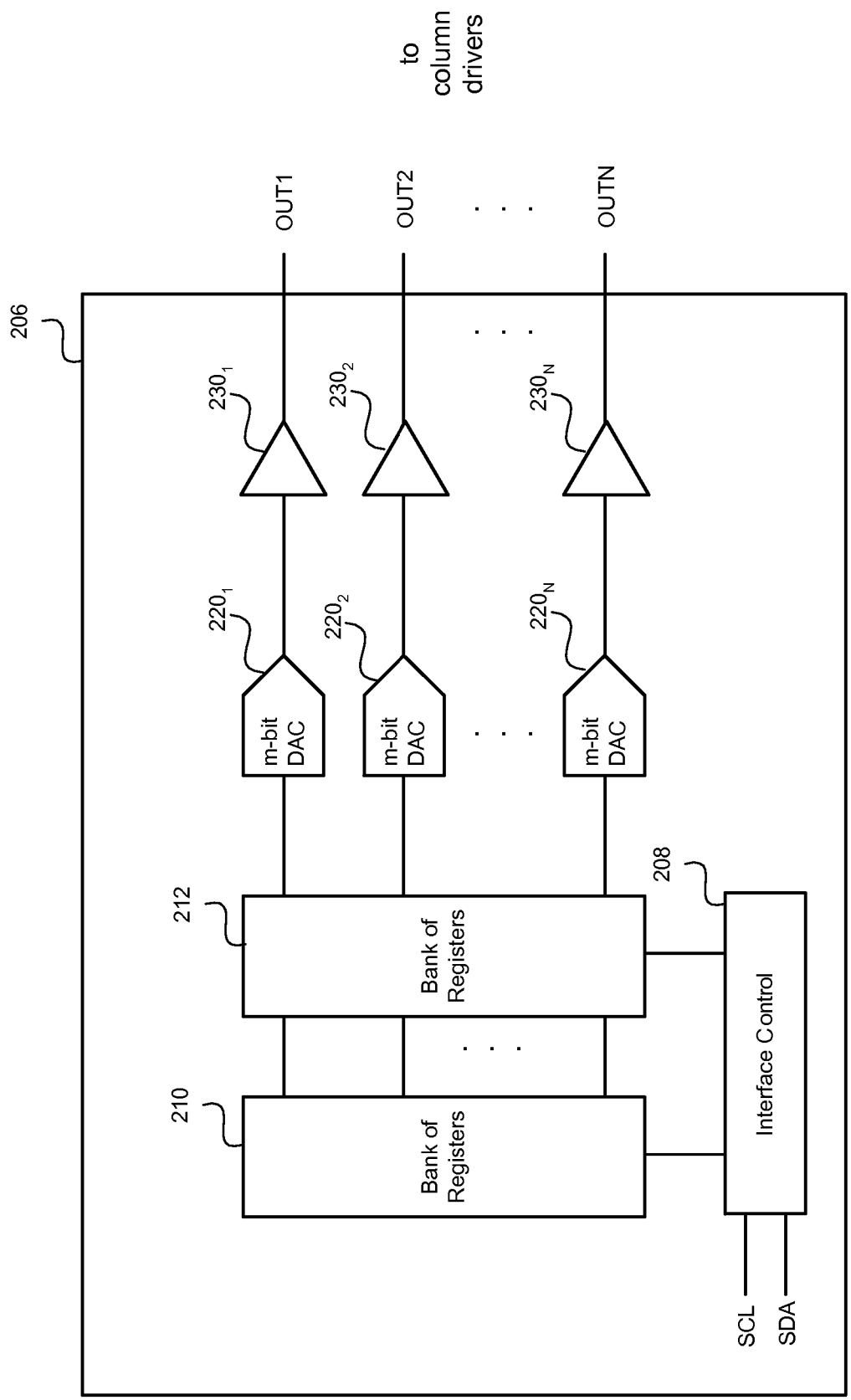
FIG. 2 is a high level block diagram showing details of a conventional reference voltage generator.

To achieve multi-reference voltage outputs, digital-to-analog converters (DACs) can be used to generate different voltages. Capacitors can be coupled to the DACs to temporarily buffer the voltages. Such a multi-reference voltage circuit has been conventionally implemented in several ways. One way uses a multi-DAC structure as shown in FIG. 2, discussed below, wherein a separate DAC is used to drive a buffer for each of the N output channels. DAC circuits are very large, however. Accordingly, with such a multi-DAC structure, as the number of output channels increase, the chip die size will become undesirably large. What is needed is a multi-reference voltage buffer small enough to be used in flat panel display packages.

In TFT-LCD applications, column drivers drive storage capacitors in TFT-LCD cells. In large panel applications, such as in television and other monitor applications, the color accuracy of the LCD display becomes more important, as it is easily perceived by the human eye. Any mismatch between the capacitor cell voltages in the LCD cell could cause these color mismatches. The multi-reference voltage generator 106 is used to improve the accuracy and reduce the mismatch of the DACs in the column driver(s) 104. Such a multi-reference voltage generator (also known as a "reference voltage generator", a "reference voltage buffer" or a "gamma buffer") provides low impedance taps in a resistor string of the column drivers 104, and thus make them match better across the display. In addition to matching the LCD column drivers, the reference voltage generator 106 is used to implement gamma correction to improve the contrast of the LCD display, as will now be described.

The data from a video card is usually linear. However, a monitor's output luminance versus input data is nonlinear. Rather, the input data versus output luminance is roughly a 2.2 power function (where $L=V^{2.2}$, where L=luminance and V=input data voltage). Accordingly, to display a "correct" luminance, the output should be gamma corrected. This can be accomplished, e.g., by applying the following function to the input data: $L'=L^{(1/2.5)}$. In addition to correcting the gamma of the LCD display, gamma correction can also stretch the gamma curve to improve the contrast of the display.

Conventionally, LCD monitors have a fixed gamma response. However, LCD manufacturers are beginning to implement dynamic gamma control, where the gamma curve is being updated on a frame-by-frame basis in an attempt to optimize the contrast on a frame-by-frame basis. This is typically accomplished by evaluating the data to be displayed, on a frame-by-frame basis, and automatically adjusting the gamma curve to provide vivid and rich colors.

FIG. 2 shows details of a conventional reference voltage generator 206, which includes an interface control 208, a pair of register banks 210 and 212, multiple (i.e., N) m-bit DACs 220 and multiple (i.e., N) buffers 230.

The interface control 208 may implement an Inter-Integrated Circuit (I2C) bus interface, which is a 2-wire serial interface standard that physically consists of two active wires and a ground connection. The active wires, Serial DAta (SDA) and Serial CLock (SCL), are both bi-directional. The key advantage of this interface is that only two lines (clock and data) are required for full duplexed communication between multiple devices. The interface typically runs at a fairly low speed (100 kHz to 400 kHz), with each integrated circuit on the bus having a unique address.

The interface control 208 receives serial data addressed to the reference voltage generator 206, converts each serial m-bits of display-data into parallel data, and transfers the parallel data bits to the first bank of registers 210. The first bank of registers 210 and the second bank of registers 212 are connected in series, such that once the first bank 210 is full, the data in the first bank 210 can be simultaneously transferred to the second bank 212. Each bank of registers 210 includes, e.g., N separate m-bit registers, where N is the number of multi-level voltage outputs (OUT1-OUTN) produced by the multi-reference voltage generator 206, and m is the number of inputs in each DAC 220.

The two register banks 210 and 212 perform double-buffering to compensate for the slow I2C interface. More specifically, while the data in the N m-bit registers in bank 212 are being converted to analog voltages by the N m-bit DACs, the N m-bit registers in bank 210 are being updated. A problem with this architecture is that for every output, an m-bit DAC 220 is required, thereby impacting the size of the die. If used for dynamic gamma control, each DAC 220 needs time to settle when it is switching between two gamma curves. In most recent applications, dynamic gamma control needs to be switched at line rates and at fast settling times of 500 ns (where the period is approximately 14-20 μs). To handle such switching rates using the architecture in FIG. 2 would require relatively large transistors (which have a relative high cost) and high currents, thereby making it unrealistic for LCD applications where cost and size are of high importance. Additionally, for a same digital code, the output voltages may have large offsets due to mismatches among the multiple DACs 220 and output buffers 230.

Accordingly, it would be beneficial to provide a reference voltage generator that includes less DACs, to thereby reduce the overall die size and cost. It would also be beneficial if such a reference voltage generator can be switched at such a rate that it can be used for dynamic gamma control at line rates. Additionally, it would be beneficial to minimize mismatches that occur within a reference voltage generator.

Figure 3A:
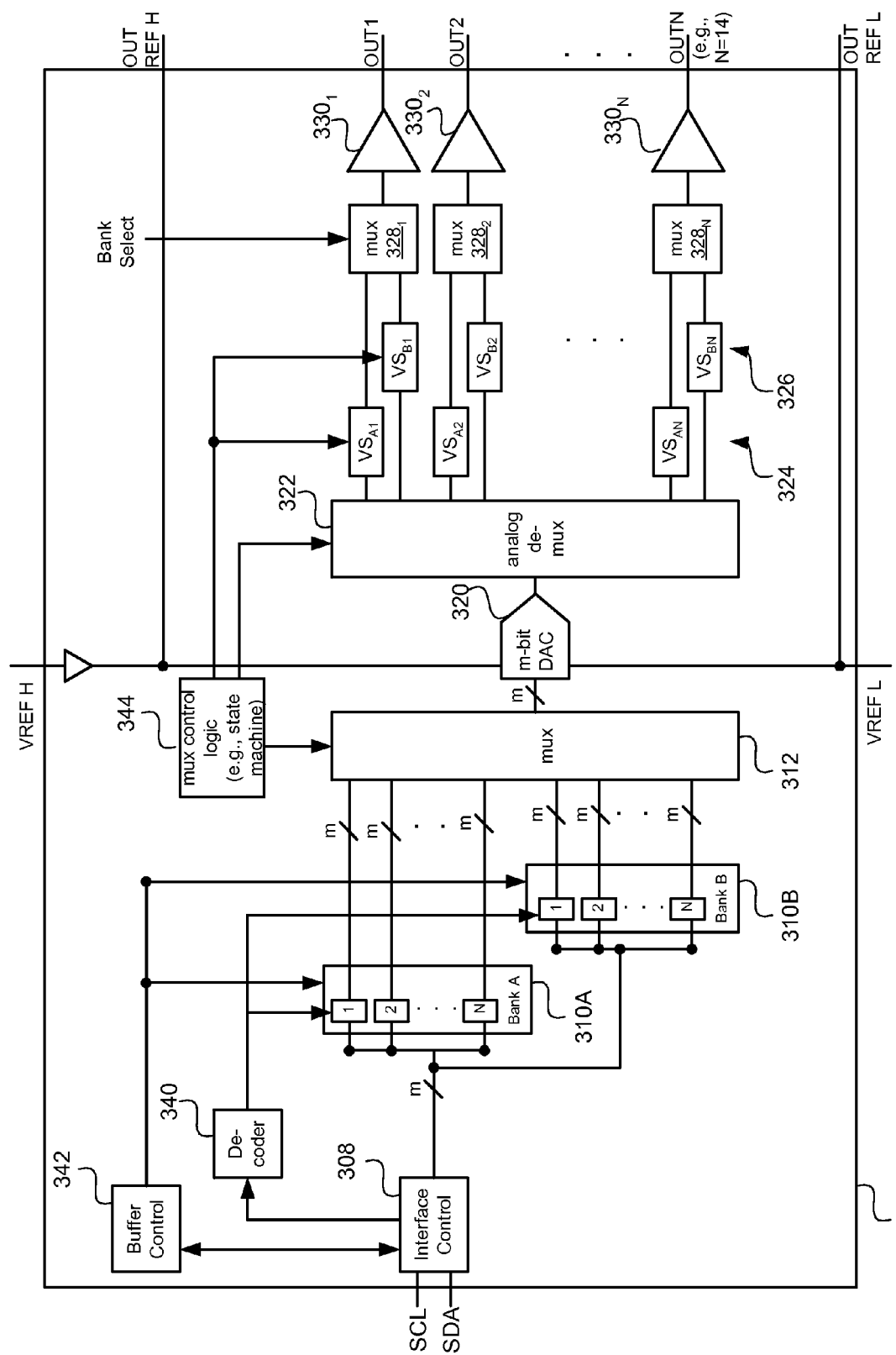
FIG. 3A is a high level block diagram of a reference voltage generator, according to an embodiment of the present invention.

FIG. 3A shows a reference voltage generator 306, according to an embodiment of the present invention. The reference voltage generator 306 is shown as including an interface control 308, which in accordance with an embodiment of the present invention implements an I2C interface, and thus receives a Serial DAta (SDA) and a Serial Clock (SCL) from a bus having two active wires. The reference voltage generator 306 is also shown as including a first bank of registers 310A (also referred to as Bank A) and a second bank of registers 310B (also referred to as Bank B), with the banks being parallel to one another, rather than being in series with one another (as was the case with banks 210 and 212 in FIG. 2).

The interface control 308 also provides an output to a decoder 340, which produces a digital output that cycles from 1 to N in a manner such that the 1st m-bit register in Bank A (or Bank B) accepts display-data 1, the 2nd m-bit register accepts display-data 2 . . . and the Nth m-bit register accepts display-data N. While the data is provided m-bits at a time to both Bank A and Bank B, only one Bank is selected at a time by the buffer control 342 to actually accept that data. As will be described in more detail below, in accordance with an embodiment of the present invention, a control bit indicates whether Bank A or Bank B is selected to store the data. While the data is provided m-bits at a time to both Bank A and Bank B, only one Bank is selected at a time by the buffer control 342 to actually accept that data.

Figure 3B:
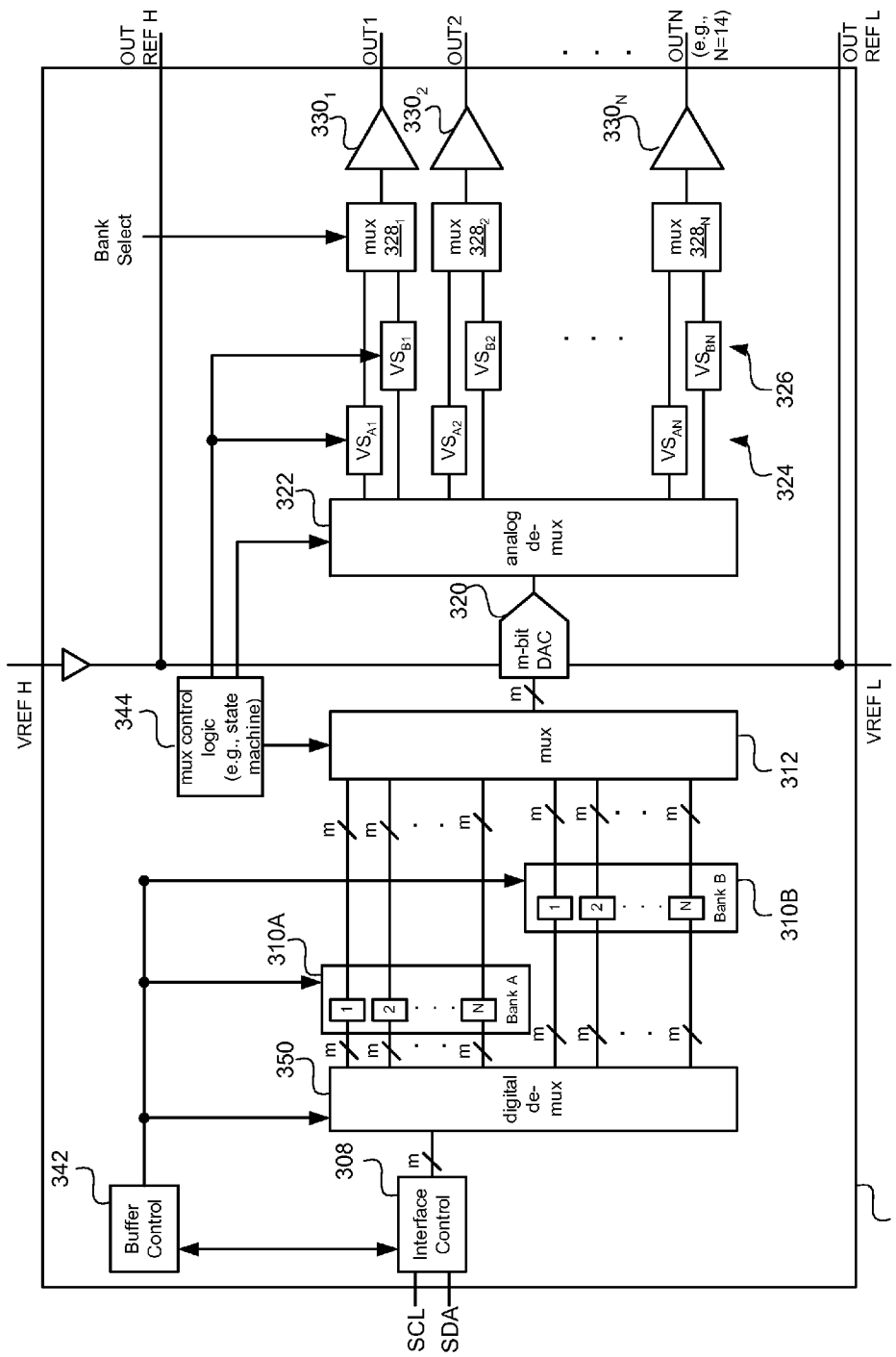
FIG. 3B is a high level block diagram of a reference voltage generator, according to another embodiment of the present invention.

Instead of having (or in addition to having) the decoder 340, a digital demultiplexer 350 can be located between the interface control 308 and the register banks 310A, 310B, as shown in FIG. 3B. This digital demultiplexer 350 would provide the 1st m-bit register in Bank A (or Bank B) with display-data 1, the 2nd m-bit register with display-data 2 . . . and the Nth m-bit register with display-data N. In accordance with an embodiment, the digital demultiplexer 350 knows which bank to provide specific data to, based on a control bit that indicates whether Bank A or Bank B should store the data. Alternatively, the digital demultiplexer 350 can provided data m-bits at a time to both Bank A and Bank B, but only one Bank is selected at a time by the buffer control 342 to actually accept that data.

The output of the first and second register banks 310A and 310B (i.e., BankA and Bank B) are provided to a multiplexer (mux) 312, the output of which drives a single DAC 320 (as opposed to multiple DACs, i.e., N DACs, as was the case in FIG. 2). The output of the DAC 320 is provided to an input of an analog demultiplexer (demux) 322. The outputs of the demux 322 are provided to a first group of voltage storage devices 324 labeled $VS_{A1}$ through $VS_{AN}$, and a second group of voltage storage devices 326 labeled $VS_{B1}$ through $VS_{BN}$. The voltage storage devices 324 and 326 can be devices such as, but not limited to, sample-and-holds, analog memory cells (e.g., analog nonvolatile memory (ANVM) cells), and the like.

As will be described below, the first group of voltage storage devices 324 ($VS_{A1}$-$VS_{AN}$) correspond to register Bank A (310A), and the second group of voltage storage devices 326 ($VS_{B1}$-$VS_{BN}$) correspond to register Bank B (310B). The outputs of $VS_{A1}$ and $VS_{B1}$ are provided to a mux $328_1$, the outputs of $VS_{A2}$ and $VS_{B2}$ are provided to a mux $328_2$ . . . and the outputs of $VS_{AN}$ and $VS_{BN}$ are provided to a mux $328_N$. In this arrangement, the multiplexers $328_1$ through $328_N$, as instructed by a Bank Select signal, are used to provide the analog voltages stored in the first group of voltage storage device 324, or the analog voltages stored in the second group of voltage storage devices 326, to the output buffers $330_1$-$330_N$, the outputs of which are provided to one or more column drivers (not shown in FIG. 3A or 3B).

Mux control logic 344 (e.g., a state machine) can be used to control the multiplexer 312 and the analog demultiplexer 322. An exemplary implementation of the mux 312, control logic 344, demux 322 and the voltage storage devices are described in commonly assigned U.S. Pat. No. 6,781,532, which is incorporated herein by reference. A specific exemplary implementation of the analog demultiplexer 322 is described in commonly invented and commonly assigned U.S. patent application Ser. No. 10/236,340, filed Sep. 5, 2002 (now allowed), which is incorporated herein by reference.

Figure 4:
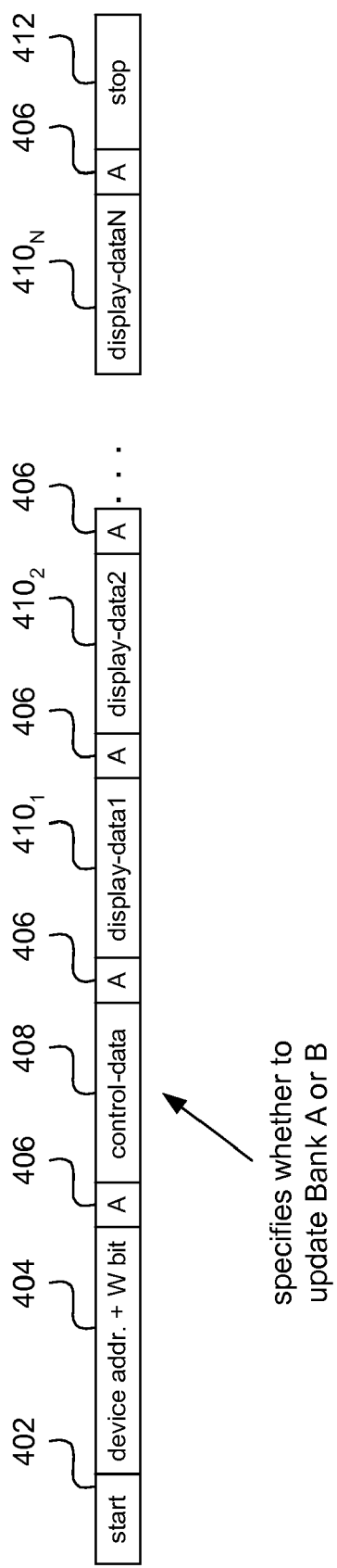
FIG. 4 is useful for illustrating a Serial DAta signal (SDA) during a write operation, according to an embodiment of the present invention.
Figure 5:
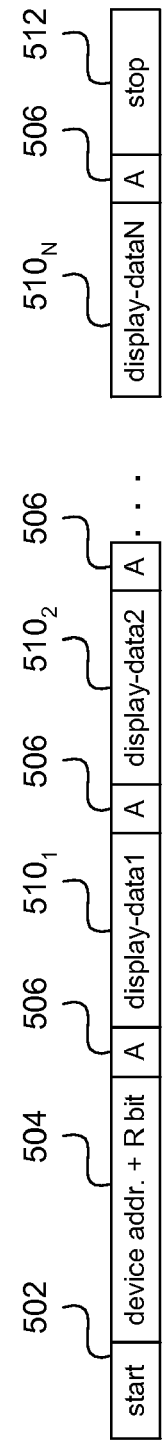
FIG. 5 is useful for illustrating a Serial DAta signal (SDA) during a read operation, according to an embodiment of the present invention.

An exemplary Serial DAta (SDA) signal received at the interface control 308 from a master device (during a write transfer) is shown in FIG. 4. An exemplary SDA output by the interface control 308 to a master device (during a read transfer) is shown in FIG. 5.

Referring to FIG. 4, the data signal is shown as including a start condition 402, a device address plus write bit 404, an acknowledge bit 406, control-data 408, an acknowledge bit 406, display-data1 $410_1$ through display-dataN $410_N$ (each of which is followed by an acknowledge bit 406) and a stop condition 412, according to an embodiment of the present invention. The device address can be, e.g., a 7 bit word identifying the voltage reference generator IC, followed by a read/write bit (e.g., 0=a write transmission where a master device will send data to the voltage reference generator to set or program a desired reference voltage; 1=a read transmission where a master device will receive data from the voltage reference generator to read the previous data from which the voltage reference was set or programmed). An exemplary master device that can be used with embodiments of the present invention includes, but is not limited to, a simple EEPROM, or a more complicated timing controller, ASIC or FPGA.

In accordance with an embodiment of the present invention, the control-data 408 is a one byte word, where the first least significant bit (LSB) indicates whether or not there is a clock delay (e.g., 0=no clock delay; 1=delay clock 3.5 µs), the second LSB indicates whether to write to Bank A or Bank B (e.g., 0=Bank A; 1=Bank B); the third LSB indicates whether to read from Bank A or Bank B (e.g., 0=Bank A; 1=Bank B); the fourth LSB indicates whether to use the an internal or external oscillator (e.g., 0=internal; 1=external); and the four most significant bits (MSBs) are don't cares.

Referring again to FIG. 3A, in operation, the interface control 308 receives a SDA and SCL signal, e.g., from a master device. Most likely, such serial data has already been gamma corrected. During a write operation, which is used to provide N multi-level voltage signals (OUT1-OUTN) to a column driver, the control bits (of the control-data 408) are provided to a buffer control 342, which can detect from the control bits whether the incoming display-data is to be stored in the first bank 310A or the second bank 310B (i.e., in Bank A or Bank B).

Referring to FIG. 3A, the interface control 308 provides m-data bits at time in parallel to both Bank A and Bank B, but depending on which one is selected by the buffer control 342, only one of the Banks (310A or 310B) stores the N m-bits of display data in its N m-bit registers (e.g., N=14 and m=8). The decoder 340 controls which m-bit registers within the selected Bank A or Bank B accepts the display data, such that the 1st m-bit register in the selected bank accepts display-data 1, the 2nd m-bit register in the selected bank accepts display-data 2 . . . and the Nth m-bit register in the selected bank accepts display-data N. In this manner, the control-data of the incoming SDA signal is used to determine whether the incoming display-data (1 through N) will update Bank A or Bank B. This feature enables a master device to either write to Bank A while keeping Bank B constant, or to write to Bank B while keeping Bank A constant.

Alternatively, referring to FIG. 3B, the interface control 308 provides m-data bits at time in parallel to the demux 350, and the demux 350 provides the m-data bits to Bank A or Bank B, depending on which one is selected by the buffer control 342, so only one of the Banks stores the N m-bits of display data in its N m-bit registers (e.g., N=14 and m=8). The demux 350 controls which m-bit registers within the selected Bank A or Bank B accepts the display data, such that the 1st m-bit register in the selected bank accepts display-data 1, the 2nd m-bit register in the selected bank accepts display-data 2 . . . and the Nth m-bit register in the selected bank accepts display-data N. In a similar manner as described above with reference to FIG. 3A, the control-data of the incoming SDA signal is used to determine whether the incoming display-data (1 through N) will update Bank A or Bank B. Again, this feature enables a master device to either write to Bank A while keeping Bank B constant, or to write to Bank B while keeping Bank A constant.

Referring to both FIGS. 3A and 3B, the register bank that is being kept constant is used to drive the single DAC 320, while the other bank gets updated. For example, while Bank B is getting updated with new display-data, the digital data in Bank A is converted into analog voltages by the single DAC 320, which is then stored in the voltage storage devices with subscripts A (i.e., into the first group of voltage storage devices 324); and while Bank A is getting updated with new display-data, the digital data in Bank B is converted into analog voltages by the single DAC 320, which is then stored in the voltage storage devices with subscripts B (i.e., into the second group of voltage storage devices 326).

More specifically, the mux 312 selects m-bits at a time to be provided to the m-inputs of the m-bit DAC 320. One of $2^m$ different analog outputs is produced at the output of the m-bit DAC 320 (depending on the m-inputs) and provided through the demux 322 to one of the voltage storage devices. At any give time, the muxs $328_1$-$328_N$, which are controlled by a Bank Select signal, determine whether the analog voltages from the first group of voltage storage devices 324 (i.e., $VS_{A1}$-$VS_{AN}$) or the second group of voltage storage devices 326 (i.e., $VS_{B1}$-$VS_{BN}$) are provided to the output buffers $330_1$-$330_N$ (which depending on implementation, may or may not provide amplification), and thereby used to drive the column driver(s). While the first group of voltage storage devices 324 (i.e., $VS_{A1}$-$VS_{AN}$) are being updated, the muxs $328_1$-$328_N$ cause the analog voltages in the second group of voltage storage devices 326 (i.e., $VS_{B1}$-$VS_{BN}$) to be provided to the output buffers $330_1$-$330_N$, and vise versa.

Advantages of the multi-reference voltage generators 306 of the present invention, described with reference to FIGS. 3A and 3B, is that instead of using one DAC per output (i.e., N separate DACs for N outputs), a single DAC 320 and multiple voltage storage devices are used, thereby saving die cost and reducing die size. Also, by using a single DAC 320, for a specific digital display-data input, the DAC 320 will not cause any mismatch (however, some mismatches may still occur if the output buffers 330 are not matched). Additionally, the settling time to switch between Bank A and Bank B is only limited by the settling time of the output buffers 330, since an analog voltage is always readily available through the groups of voltage storage devices 324 or 326.

Figure 6:
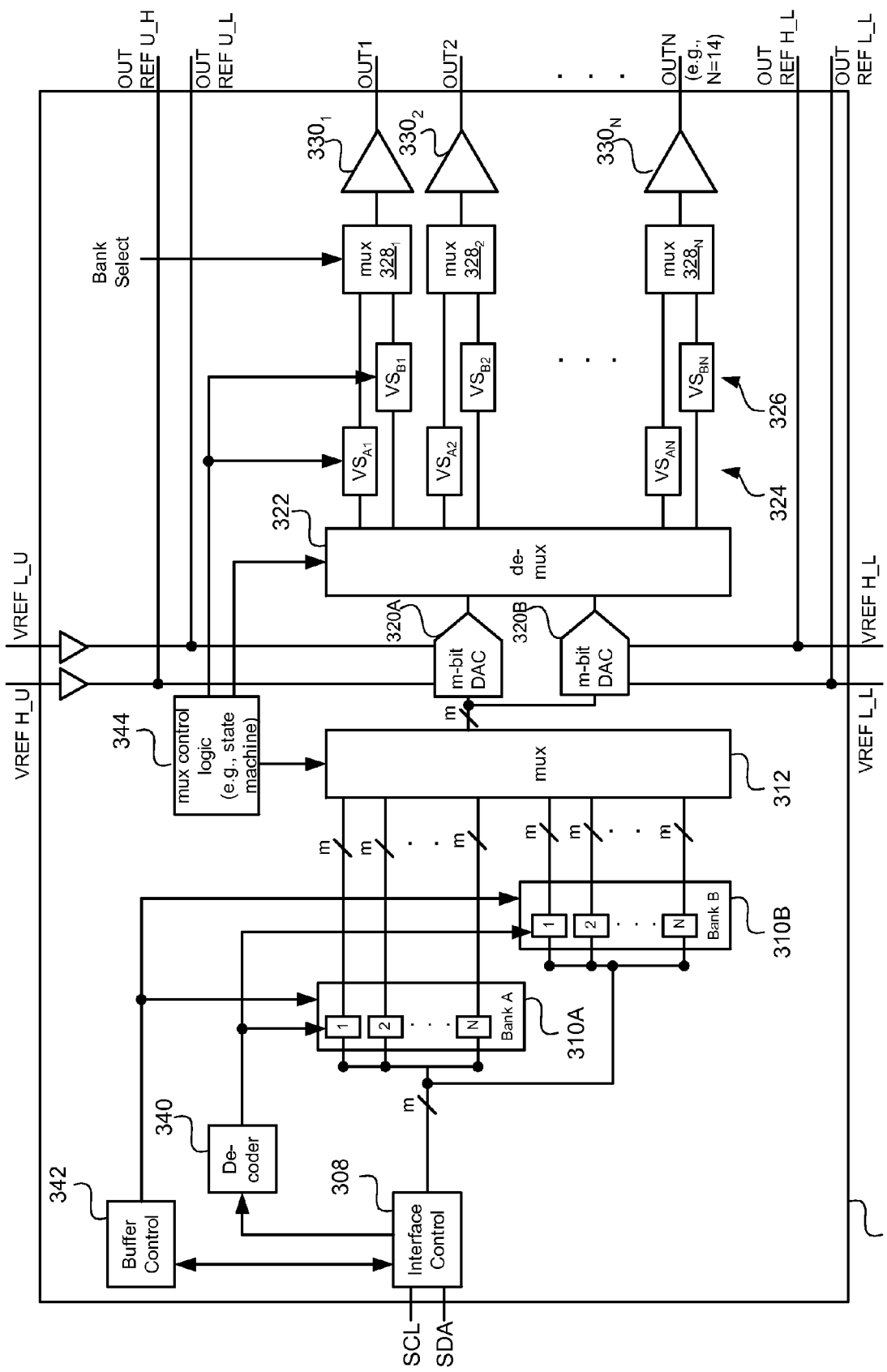
FIG. 6 is a high level block diagram of a reference voltage generator, according to a further embodiment of the present invention.

In another embodiment, shown in FIG. 6, rather than using a single DAC 320, a pair of DACs 320A and 320B are used, one being associated with Bank A and the other being associated with Bank B. While two DACs cost more and take up more die space than a single DAC, two DACs are less costly and take up less die space than N DACs, where N is greater than 2 (e.g., N may equal 14).

In one embodiment, the display-data written into the first register bank 310A (i.e., Bank A) corresponds to a first gamma curve, and the display-data written into the second register bank 310B (i.e., Bank B) corresponds to a second gamma curve, thereby enabling fast switching between two different gamma curves, e.g., on a frame-by-frame basis. Embodiments of the present invention are also useful in an environment where more than one pixel (e.g., a pair of pixels) is used to display each word of display-data (i.e., where the same display data, gamma corrected in more than one manner, is used to drive more than one pixel). In such an environment, each pixel may have a different gamma associated with it, or each pixel may have a dynamic gamma associated with it that is updated on a line basis.

In accordance with an embodiment of the present invention, half of the N voltage outputs (e.g., OUT1-OUTN/2) have a positive voltage polarity, and the other half (e.g., OUTN/2+1-OUTN) have a negative polarity. For example, if there are 14 voltage outputs (i.e., if N=14), then OUT1-OUT7 have a positive polarity, and OUT8-OUT14 have a negative polarity. The column driver(s) being driven by the reference voltage generator 302 receive positive voltage output OUT1-OUT7 during one frame, and then negative voltage outputs OUT8-OUT14 during a next frame, and so on, so that pixel voltages are reversed in polarity every frame so that the capacitor(s) associated with each pixel is not damaged. In such an embodiment, the reference voltage generator 302 will also output a middle voltage, known as VCOM. In each bank of registers 310A and 310B, half of the 14 registers (where N=14) will store positive display data, and the other half will store negative data that is the inverse of what is stored in the first half. This will cause the analog voltages OUT1 to OUT7 be the completely symmetrical with OUT8 to OUT14 around the VCOM voltage. The terms positive and negative, as used herein, are relative to VCOM. That is, if a voltage is greater than VCOM it is considered positive relative to VCOM, if a voltage is less than VCOM it is considered negative relative to VCOM.

In accordance with another embodiment, in order to reduce the number of registers in each bank 310A and 310B in half, only positive (or negative) display data is stored in the banks 310A and 310B, and appropriate digital inversion of the display data takes place between banks 310A, 310B and the DAC 320 (on either side of mux 312). In other words, since the analog voltages are completely symmetrical around VCOM, the digital data in half of the registers (e.g., the top half of the data registers) can be converted to digital data that would have been stored by the other half of the registers (e.g., the bottom half of the data registers) by just using a simple arithmetic function of 2's complement.

An example of this phenomena (assuming an 8-bit DAC) is shown in Table 1, shown below.

TABLE 1

|  | Analog Voltage Required | Digital Data | DAC output |
| --- | --- | --- | --- |
| VrefH_U | 14.16 | | |
| OUT1 | 13.89 | 1 1 1 1 0 1 0 1 | 13.8953125 |
| OUT2 | 13.47 | 1 1 1 0 0 0 1 1 | 13.4621875 |

TABLE 1-continued

| | Analog Voltage Required | Digital Data | DAC output |
|---|---|---|---|
| OUT3 | 11.45 | 1 0 0 0 1 1 1 1 | 11.4409375 |
| OUT4 | 11.16 | 1 0 0 0 0 0 1 1 | 11.1521875 |
| OUT5 | 10.78 | 0 1 1 1 0 0 1 1 | 10.7671875 |
| OUT6 | 10.5 | 0 1 1 0 1 0 0 0 | 10.5025 |
| OUT7 | 9.86 | 0 1 0 0 1 1 0 1 | 9.8528125 |
| VrefL_U | 8 | | |
| VCOM | 7.64 | | |
| VrefH_L | 7.28 | | |
| OUT8 | 5.42 | 1 0 1 1 0 0 1 1 | 5.4271875 |
| OUT9 | 4.78 | 1 0 0 1 1 0 0 0 | 4.7775 |
| OUT10 | 4.5 | 1 0 0 0 1 1 0 1 | 4.5128125 |
| OUT11 | 4.12 | 0 1 1 1 1 1 0 1 | 4.1278125 |
| OUT12 | 3.83 | 0 1 1 1 0 0 1 0 | 3.8390625 |
| OUT13 | 1.81 | 0 0 0 1 1 1 0 1 | 1.8178125 |
| OUT14 | 1.39 | 0 0 0 0 1 0 1 1 | 1.3846875 |
| VrefL_L | 1.12 | | |

As can be seen above, the digital data of OUT14 is the 2's complement of OUT1, OUT13 is the 2's complement of OUT2, and so on. Although not specifically shown in FIGS. 3A and 3B, the functional block that would perform the above described functions (that allow for halving of the number of registers in each register bank) would be located between the banks 310A, 310B and the mux 312, or between the mux 312 and the DAC 320, in accordance with specific embodiments of the present invention.

As mentioned above, in the embodiment of FIG. 6 a pair of DACs 320A and 320B can be used (which is still less than N DACs, when N is, e.g., 14 as in this example), each associated with one of the banks 310A and 310B. Each DAC has its own reference voltages. For example, the top DAC 320A references are VrefH_U=14.16 and VrefL_U=8V, and the bottom DAC 320B references are VrefH_L=7.28 and VrefL_L=1.12 respectively.

In accordance with an embodiment of the present invention, the top DAC output implements the function (VrefH_U−VrefL_U)*(Digital Data)/256+VrefL_U; and the bottom DAC output implements the function (VrefH_L−VrefL_L)*(Digital Data)/256+VrefL_L. The pair of DACs 320A and 320B can also be used with the embodiment of FIG. 3B.

An alternate way of implement this function is to swap the voltage references in the bottom DAC 320B, such that VrefH_L=1.12 and VrefL_L=7.28. By doing so, the digital data does not need to be arithmetically changed. Table 2 below shows such a thing.

TABLE 2

| | Analog Voltage Required | Digital Data | DAC output |
|---|---|---|---|
| VrefH_U | 14.16 | | |
| OUT1 | 13.89 | 1 1 1 1 0 1 0 1 | 13.8953125 |
| OUT2 | 13.47 | 1 1 1 0 0 0 1 1 | 13.4621875 |
| OUT3 | 11.45 | 1 0 0 0 1 1 1 1 | 11.4409375 |
| OUT4 | 11.16 | 1 0 0 0 0 0 1 1 | 11.1521875 |
| OUT5 | 10.78 | 0 1 1 1 0 0 1 1 | 10.7671875 |
| OUT6 | 10.5 | 0 1 1 0 1 0 0 0 | 10.5025 |
| OUT7 | 9.86 | 0 1 0 0 1 1 0 1 | 9.8528125 |
| VrefL_U | 8 | | |
| VCOM | 7.64 | | |
| VrefH_L | 1.12 | | |
| OUT8 | 5.42 | 0 1 0 0 1 1 0 1 | 5.4271875 |
| OUT9 | 4.78 | 0 1 1 0 1 0 0 0 | 4.7775 |
| OUT10 | 4.5 | 0 1 1 1 0 0 1 1 | 4.5128125 |
| OUT11 | 4.12 | 1 0 0 0 0 0 1 1 | 4.1278125 |
| OUT12 | 3.83 | 1 0 0 0 1 1 1 1 | 3.8390625 |
| OUT13 | 1.81 | 1 1 1 0 0 0 1 1 | 1.8178125 |
| OUT14 | 1.39 | 1 1 1 1 0 1 0 1 | 1.3846875 |
| VrefL_L | 7.28 | | |

Figure 7:
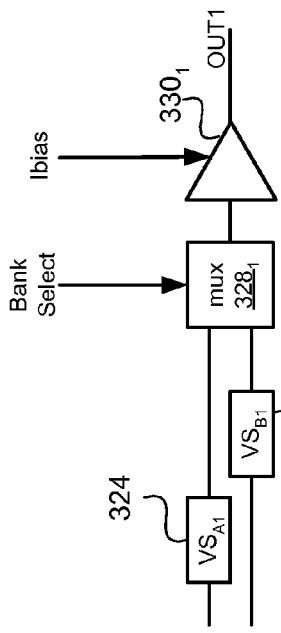
FIG. 7 is a high level block diagram that is useful for explaining that the buffers shown in the previous FIGS. are provided with a bias current.

FIG. 7 illustrates a portion of the reference voltage generators 306 discussed above. More specifically, FIG. 7 shows that a bank select signal, provided to a mux 328, is used to select between two different voltage levels, one of which is stored in a first voltage storage device 324, and the other of which is stored in a second voltage storage device 326. The selected voltage is provided, by the mux 328, to the buffer 330, which outputs a buffered (and optionally amplified) version of the selected voltage.

Also shown in FIG. 7 (but not shown in previous FIGS) is that a bias current (Ibias) is provided to the buffer 330. The magnitude of this bias current (Ibias), at least in part, controls the slew rate and settling time of the buffer 330, with higher bias currents typically resulting in faster slew rates and settling times.

A potential issue with the implementation of FIG. 7, is that providing a sufficiently high bias current to enable the buffer 330 to have a sufficiently fast slew rate and settling time may consume an undesirable high amount of power. This is especially a problem with battery powered portable devices, where there is a desire to minimize power consumption, to thereby maximize the time between battery re-charges or battery replacements. The following embodiments of the present invention, described below, reduce the power consumption due to such bias currents.

Figure 8:
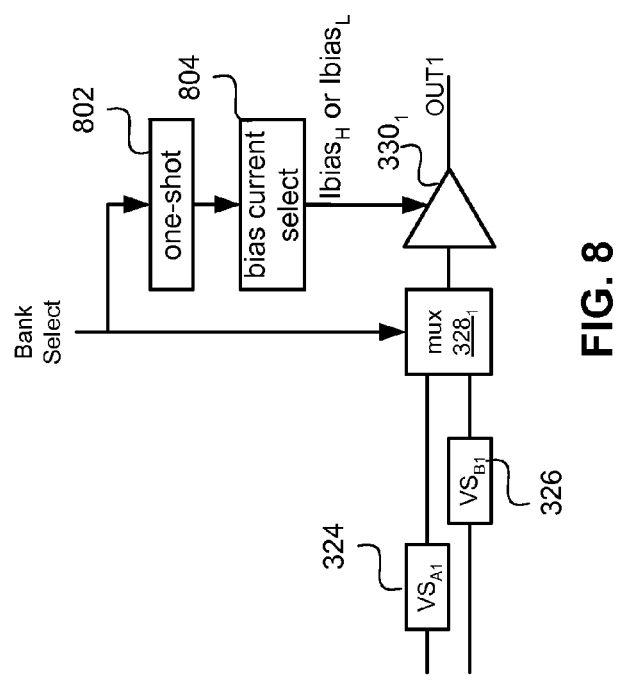
FIG. 8 is a high level block diagram that is useful for describing an embodiment of the present invention where the bias current provided to a buffer, or similar device, is lowered, to reduce power consumption, when the input to and output from the device is not transitioning from one level to another.

The following embodiments of the present invention take advantage of the realization that fast slew rates and settling times are important when the output of the buffer 330 is transitioning from one state to another (e.g., one voltage to another), but not necessarily important when there is no such transitioning. More specifically, in accordance with specific embodiments of the present invention, the bias current provided to the buffer 330 is increased when the input to, and thus the corresponding output from, the buffer 330 are to transition from one level to another; and the bias current provided to the buffer is reduced when the input to, and thus the corresponding output from, the buffer 330 is not transitioning. Stated another way, a relatively high bias current (Ibias$_H$) is used when the output of a buffer is transitioning, and a relatively low bias current (Ibias$_L$) is used when the output of the buffer is not transitioning, where Ibias$_H$=M*Ibias$_L$ (e.g., M=4). For example, the input to, and the corresponding output from, the buffer 330 are not to transition from one level to another after the input to the buffer 330 has already transitioned from a first level to a second level and is to remain at the second level for a period of time. For another example, the input to, and the corresponding output from, the buffer 330 are not to transition from one level to another after the input to the buffer 330 has already transitioned from the second level to the first level and is to remain at the first level for a period of time. FIG. 8, described below, shows one implementation of such embodiments.

Figure 9:
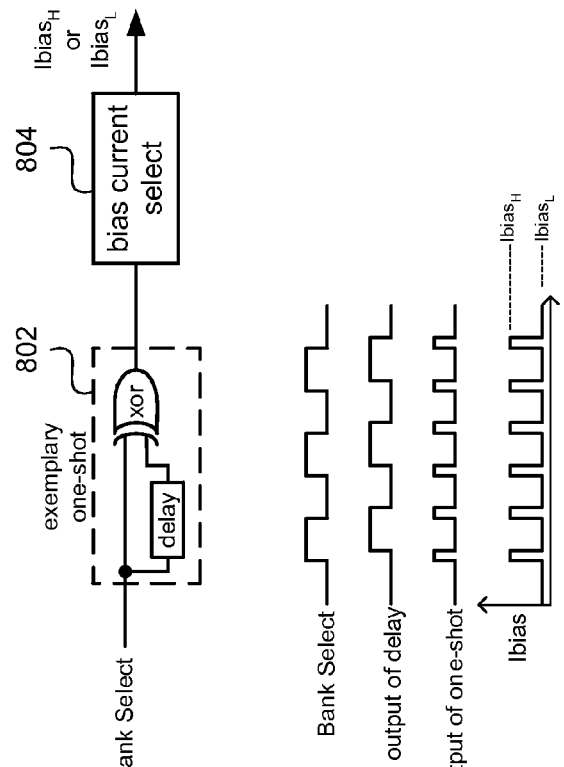
FIG. 9 illustrates exemplary details of the one-shot shown in FIG. 8, as well as a timing diagram that is useful for understanding the operation of the embodiment of the present invention introduced in FIG. 8.

Referring to FIG. 8, a one shot 802 and a bias current selector 804 are added to the elements of FIG. 7. The one shot 802 receives the bank select signal, which is indicative of the input to and the output from the buffer 330 transitioning from one voltage level to another. Exemplary details of the one-shot 802 are shown in FIG. 9, as is an exemplary timing diagram for a bank select signal, a signal output by a delay element of the exemplary one-shot, a signal output by the one-shot 802, and a signal output by the bias current selector 804. As mentioned above, the bank select signal is indicative of transitions from one voltage level to another.

Referring to FIGS. 8 and 9, the one-shot 802, in this example, produces a short pulse in response to rising edges of the bank select signal and falling edges of the bank select signal, where both rising and falling edges of the bank select signal are indicative of voltage level changes. The bias current selector 804 receives the pulsed signal output by the one-shot 802, and in response thereto, changes the level of the bias current output therefrom. More specifically, when the one-shot signal goes from low to high, the bias current selector 804 increases the bias current from $Ibias_L$ to $Ibias_H$; and when the one-shot signal goes from high to low, the bias current selector 804 reduces the bias current from $Ibias_H$ to $Ibias_L$. In accordance with an embodiment, $Ibias_H$ is at least twice $Ibias_L$, however this is not necessary.

Figures 10, 11:
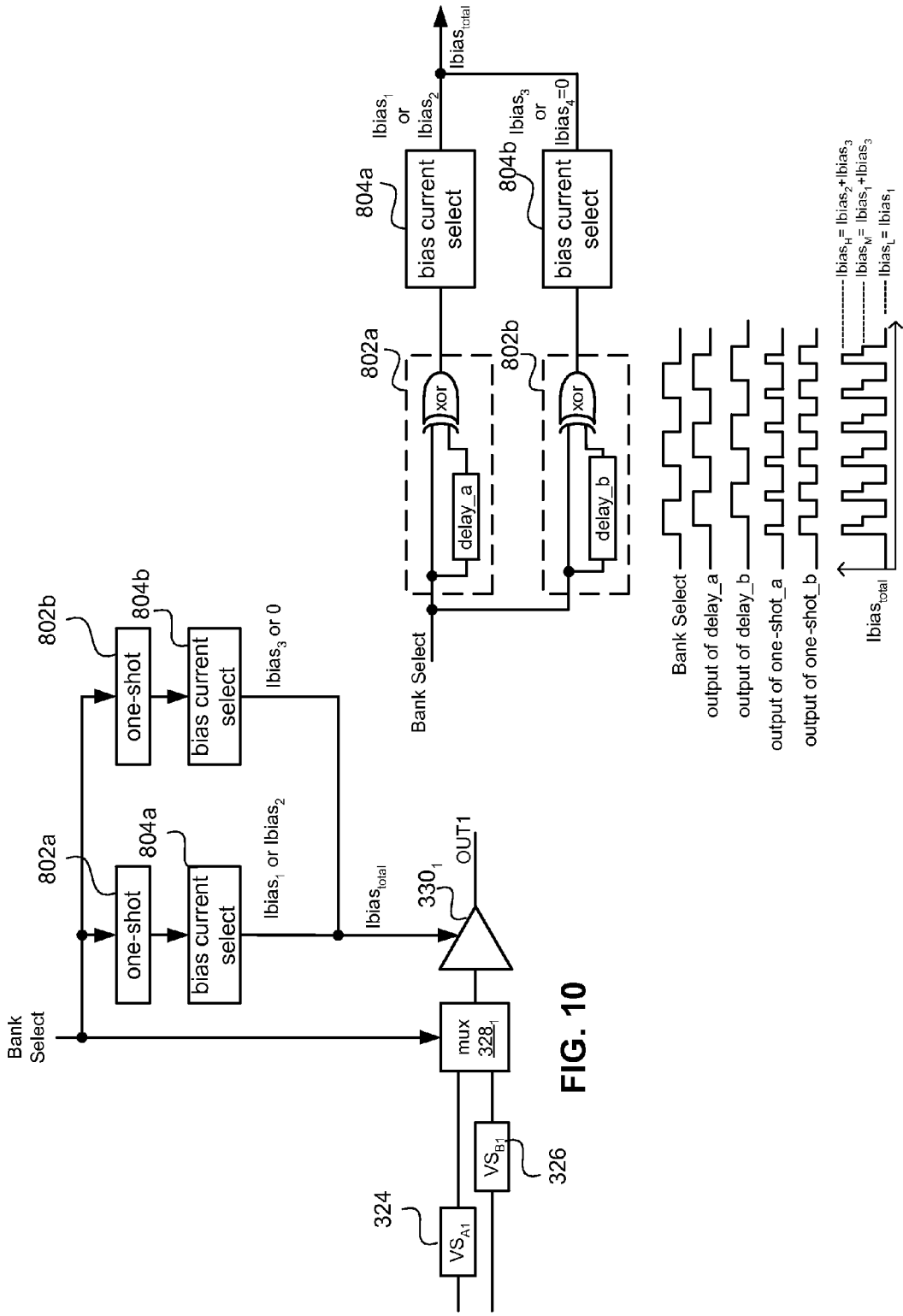
FIG. 10 is a high level block diagram that is useful for describing embodiments of the present invention where more than two bias current levels can be provided to a buffer or similar device.
FIG. 11 illustrates exemplary details of the one-shots shown in FIG. 10, as well as a timing diagram that is useful for understanding the operation of the embodiment of the present invention introduced in FIG. 10.

In accordance with embodiments of the present invention, more than one one-shot 802 and bias current selector 804 can be used, to produce additional levels of bias currents. An example of this is shown in FIGS. 10 and 11. Referring to FIG. 10, two one-shots 802a and 802b and two bias current selectors 804a and 804b are shown as receiving the same bank select signal, which is indicative of the input to and the output from the buffer 330 transitioning from one voltage level to another. Exemplary details of the one-shots 802a and 802b are shown in FIG. 11, as is an exemplary timing diagram for a bank select signal, the signals output by the delay elements of the exemplary one-shots 802a and 802b, the signals output by the one-shots 802a and 802b, and the total output bias current ($Ibias_{total}$), which is a sum of the current signals output by the two bias current selectors 804a and 804b. In this example, the delay element (delay_b) of the one-shot 802b produces a greater delay than the delay element (delay_a) of the one-shot 802a, as can be appreciated from the timing diagram. This will result in the pulsed output of the one-shot 802b being high for a longer period of time than the pulsed output of the one-shot 802a. In turn, this will result in the total bias current ($Ibias_{total}$) having more than two levels, as shown in the timing diagram.

In this embodiment, the highest bias current level ($Ibias_H$) is used to increase the slew rate when the input to the buffer 330, and the corresponding output from the buffer 330, are to transition from one level to another. However, rather than dropping directly to a low bias level ($Ibias_L$) when it is known that the input to the buffer 330, and the corresponding output from the buffer 330, are not to transition from one level to another (e.g., after the input and output of the buffer are done transitioning), a medium bias level ($Ibias_M$) is used to assist with settling the internal nodes of the buffer 330 more smoothly (as opposed to having a relatively abrupt drop from $Ibias_H$ directly to $Ibias_L$). This is useful where internal nodes of the buffer 330 (or other device) take some time to settle. The low bias level ($Ibias_L$), which consumes the least power of the three bias current levels, then follows the medium bias level ($Ibias_M$). Providing of the medium bias level current ($Ibias_M$) consumes less power than providing the high bias current level ($Ibias_H$), and providing the low bias level ($Ibias_L$) consumes even less power. Thus, it is beneficial to keep the bias current at the low bias level ($Ibias_L$) as often as practical.

In the example of FIGS. 10 and 11, the bias current selector 804b produces an $Ibias_3$ current, or an $Ibias_4$ equal to zero current. If the fourth bias current produced by the bias current selector 804b were a current other than zero current, then a further level could be added to the $Ibias_{total}$. Additionally, or alternatively, further one-shots 802 (having different delays) and further bias current selectors 804 can be added to provide even more levels for the bias current $Ibias_{total}$, if desired.

In the embodiment of FIGS. 10 and 11, the bias current was described as jumping relatively abruptly from the low bias level ($Ibias_L$) to the high bias level ($Ibias_H$) when an input to, and a corresponding output from, the buffer 330 are to transition from one level to another. If the bias current levels can be switched fast enough, it is also possible that a medium bias current level can be used, such that there is a jump from the low bias level ($Ibias_L$) to a medium bias current level ($Ibias_M$), before there is the jump to the high bias level ($Ibias_H$). This may be useful to assist with settling of internal nodes of the buffer 330, if desired.

The bank select signal is just one example of a control signal that specifies when the input to and output from the buffer (or other similar device, as discussed below) is to transition from one level to another level. In other words, other control signals are possible, and within the scope of the present invention. Also, where there are multiple one-shots, it is possible that each one-shot receive a separate control signal, or delayed versions of a common control signal. Further, FIGS. 9 and 11 illustrate just one example of a one-shot. Other one-shots, such as but not limited to a one-shot implemented by a flip-flop, can be used, and are within the scope of the present invention.

There are various ways that the bias current selector 804 can be implemented. For example, the bias current selector 804 can be implemented using a current multiplier or amplifier, e.g., where the current multiplier or amplifier that increases $Ibias_L$ to create $Ibias_H$, when the output of the one-shot is high. One of ordinary skill in the art will appreciate, from this description, that numerous other techniques can be used to implement the bias current selector 804.

Provided above is a description of how to reduce the power used to drive a buffer within a system that is used for driving a display, where an output from the buffer transitions from one level to another in response to a corresponding input to the buffer transitioning from one level to another. Similar techniques can be used with other types of devices, used for driving or otherwise controlling a display, where the device is to transitions from one level to another in response to a corresponding input to the device transitioning from one level to another. For example, embodiments of the present invention can also be used to reduce the amount of power consumed by a digital-to-analog converter, an analog-to-digital (A/D) converter, a voltage-to-current (V2I) converter, and/or a current-to-voltage (I2V) converter, because each of these devices draw a bias current, and each of these devices include inputs and outputs that transition from one level to another. Referring back to FIG. 1, such devices can be located, e.g., within the reference voltage generator 106, or within the column driver 104, but are not limited thereto.

While the embodiments of the present invention described with reference to FIGS. 7-11 are useful to improve upon the embodiments described with references to FIGS. 3-6, the embodiments of FIGS. 7-11 are not limited to such use. Rather, the embodiments described with reference to FIGS. 7-11 are useful for reducing power consumed by any device within any system that is used for driving or otherwise controlling a display, where an output from the device transitions from one level to another in response to a corresponding input to the device transitioning from one level to another.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A method for reducing power consumed by a device within a system that is used to drive or otherwise control a display, where an output from the device transitions from one output level to another in response to a corresponding input to the device transitioning from one input level to another, the method comprising:
    receiving a control signal that specifies when the input to the device is to transition from one input level to another, in response to which the corresponding output of the device will transition from one output level to another, wherein the control signal selects between at least two input levels, wherein the input to the device will transition from one input level to another when a change in the control signal changes which of the at least two input levels is selected, and wherein after the input to the device has transitioned the input to the device will not transition again for a period of time;
    using XOR logic producing, based on the control signal and a delayed version of the control signal, a pulsed signal having a leading edge that generally coincides with the input to the device transitioning from one level to another and a trailing edge that occurs a predetermined delay after the leading edge, where the predetermined delay is defined by a delay between the control signal and the delayed version of the control signal;
    providing a first bias current level to the device when a change in the control signal changes which of the at least two input levels is selected and thereby specifies that the input to, and the corresponding output from, the device are to transition;
    after providing the first bias current level to the device, before a next change in the control signal, providing a second bias current level to the device after the input to and the corresponding output from the device have already transitioned and are not to transition again for the period of time, the second bias current level being lower than the first bias current level;
    using the leading edge of the pulsed signal to specify when the bias current provided to the device is to transition from the first bias current level to the second bias current level; and
    using the trailing edge of the pulsed signal to specify when the bias current provided to the device is to transition from the second bias current level to the first bias current level.

2. The method of claim 1, further comprising, whenever the bias current provided to the device is to be lowered from the first bias current level to the second bias current level:
    after providing the first bias current level to the device, before the next change in the control signal, and after the input to and the corresponding output from the device have already transitioned and are not to transition again for the period of time, but before providing the second bias current level, providing for a predetermined period of time a constant further bias current level to the device, the further bias current level being lower than the first bias current level but higher than the second bias current level.

3. The method of claim 2, wherein the further bias current level is used to assist with settling internal nodes of the device more smoothly than if the there was an abrupt drop from the first bias current level to the second bias current level.

4. The method of claim 1, wherein the second bias current level is at least half of the first bias current level.

5. The method of claim 1, wherein the input to, and the corresponding output from, the device are not to transition from one level to another after the input to the device has already transitioned from a first level to a second level and is to remain at the second level for a period of time.

6. The method of claim 1, wherein the device is one of the following:
    a buffer;
    a digital-to-analog converter;
    an analog-to-digital converter;
    a voltage-to-current converter; and
    a current-to-voltage converter.

7. The method of claim 1, wherein:
    a slew rate and/or settling time of the device is affected by a bias current provided to the device; and
    providing the first bias current level to the device enables the device to have a faster slew rate and/or settling time as compared to when providing the second bias current level to the device.

8. The method of claim 1, further comprising:
    receiving a select signal that specifies whether the input to the device is a voltage stored by a first voltage storage device or a voltage stored by a second voltage storage device;
    wherein the step of providing the first bias current level to the device occurs when the select signal specifies that the input to the device is to change from being a voltage stored by the first voltage storage device to being a voltage stored by the second voltage storage device, or vice versa; and
    wherein the step of providing the second bias current level to the device occurs after the input to the device has changed from being a voltage stored by the first voltage storage device to being a voltage stored by the second voltage storage device, or vice versa, and the input is to remain the same for a period of time.

9. The method of claim 1, wherein the control signal comprises a bank select signal.

10. A configuration for reducing power consumed by a device within a system that is used for driving or otherwise controlling a display, where an output from the device transitions from one level to another in response to a corresponding input to the device transitioning from one level to another, comprising:
    a device within a system that is used for driving or otherwise controlling a display, the device including an input and an output, and the device receiving a bias current;
    a one-shot that receives a control signal that specifies when the input to the device is to transition from one input level to another, in response to which the corresponding output of the device will transition from one output level to another, wherein the control signal selects between at least two input levels, wherein the input to the device will transition from one input level to another when a change in the control signal changes which of the at least two input levels is selected, and wherein after the input to the device has transitioned the input to the device will not transition again for a period of time; and a bias current selector that provides to the device, in response to an output from the one-shot, one of a first bias current level and a second bias current level, where the second bias current level is lower than the first bias current level;

wherein after the bias current selector provides the first bias current level to the device, before a next change in the control signal, the bias current selector provides the second bias current level to the device after the input to, and the corresponding output from, the device have already transitioned and are not to transition again for the period of time;

wherein the one-shot includes XOR logic that produces, based on the control signal and a delayed version of the control signal, a pulsed signal having a leading edge that generally coincides with the input to the device transitioning from one input level to another and a trailing edge that occurs a predetermined delay after the leading edge, where the predetermined delay is defined by a delay between the control signal and the delayed version of the control signal;

wherein the leading edge of the pulsed signal is used to specify when the bias current provided to the device by the bias current selector is to transition from the first bias current level to the second bias current level; and wherein the trailing edge of the pulsed signal is used to specify when the bias current provided to the device by the bias current selector is to transition from the second bias current level to the first bias current level.

11. The configuration of claim 10, further comprising:
a second one-shot that receives a control signal that specifies when the input to the device is to transition from one level to another level; and
a second bias current selector that provides to the device, in response to an output from the second one-shot, one of a third bias current level and a fourth bias current level, which is added to the first or second bias current level output of by the bias current selector.

12. The configuration of claim 11, where the control signal provided to the second bias current selector is the same as the control signal provided to the first bias current selector.

13. The configuration of claim 11, wherein the fourth bias current level is substantially a zero current level.

14. The configuration of claim 10, wherein the second bias current level is at least half of the first bias current level.

15. The configuration of claim 10, wherein the input to, and the corresponding output from, the device are not to transition from one level to another after the input to the device has already transitioned from a first level to a second level and is to remain at the second level for a period of time.

16. The configuration of claim 10, wherein the device is one of the following:
a buffer;
a digital-to-analog converter;
an analog-to-digital converter;
a voltage-to-current converter; and
a current-to-voltage converter.

17. The configuration of claim 10, wherein:
a slew rate and/or settling time of the device is affected by a bias current provided to the device; and
the device has a faster slew rate and/or settling time when the device is provided the first bias current level as compared to when the device is provided the second bias current level.

18. The configuration of claim 10, wherein:
the one-shot receives a select signal that specifies whether the input to the device is a voltage stored by a first voltage storage device or a voltage stored by a second voltage storage device;
the bias current selector provides the first bias current level to the device when the select signal specifies that the input to the device is to change from being a voltage stored by the first voltage storage device to being a voltage stored by the second voltage storage device, or vice versa; and
the bias current selector provides the second bias current level to the device after the input to the device has changed from being a voltage stored by the first voltage storage device to being a voltage stored by the second voltage storage device, or vice versa, and the input is to remain the same for a period of time.

19. The configuration of claim 10, wherein the control signal comprises a bank select signal.

20. A method for reducing power consumed by a device within a system that is used for driving or otherwise controlling a display, where an output from the device transitions from one output level to another in response to a corresponding input to the device transitioning from one input level to another, and where the device receives a bias current, the method comprising:
receiving a control signal that specifies when the input to the device is to transition from one input level to another level, in response to which the corresponding output of the device will transition from one level to another, wherein the control signal selects between at least two input levels, wherein the input to the device will transition from one input level to another when a change in the control signal changes which of the at least two input levels is selected, and wherein after the input to the device has transitioned the input to the device will not transition again for a period of time;
producing, based on the control signal and a delayed version of the control signal, a pulsed signal having a leading edge that generally coincides with the input to the device transitioning from one input level to another and a trailing edge that occurs a predetermined delay after the leading edge, where the predetermined delay is defined by a delay between the control signal and the delayed version of the control signal; and
selectively providing one of at least two bias current levels to the device based on the pulsed signal;
wherein a first bias current level is provided to the device when a change in the control signal changes which of the at least two input levels is selected and thereby specifies that the input to and the corresponding output from the device are to transition;
wherein after providing the first bias current level, before a next change in the control signal, providing a constant intermediate bias current level to the device for a redetermined period of time and then providing a second bias current level to the device, after the input to and the corresponding output from the device have already transitioned and are not to transition again for the period of time and
wherein the second bias current level is less than the first bias current level, and the intermediate bias current level is less than the first bias current level and greater than the second bias current level.

21. The method of claim 20, further comprising:
determining when the input to the device is to transition from one level to another based on a control signal; and using the same control signal to control the selectively providing.

22. The method of claim 20, wherein the input to, and the corresponding output from, the device are not to transition from one level to another after the input to the device has already transitioned from a first level to a second level and is to remain at the second level for a period of time.

23. The method of claim 20, wherein the device is one of the following:
a buffer;
a digital-to-analog converter;
an analog-to-digital converter;
a voltage-to-current converter; and
a current-to-voltage converter.

24. The method of claim 20, wherein second bias current level is at least half of the first bias current level.

25. The method of claim 20, wherein:
a slew rate and/or settling time of the device is affected by a bias current provided to the device; and
the device has a faster slew rate and/or settling time when the device is provided the first bias current level as compared to when the device is provided the second bias current level.

26. The method of claim 20, wherein the at least one further bias current level is used to assist with settling internal nodes of the device more smoothly than if the there was an abrupt drop from the first bias current level to the second bias current level.

27. The method of claim 20, further comprising:
receiving a select signal that specifies whether the input to the device is a voltage stored by a first voltage storage device or a voltage stored by a second voltage storage device;
wherein the first bias current level is provided to the device when the select signal specifies that the input to the device is to change from being a voltage stored by the first voltage storage device to being a voltage stored by the second voltage storage device, or vice versa; and
wherein the second bias current level is provided to the device after the input to the device has changed from being a voltage stored by the first voltage storage device to being a voltage stored by the second voltage storage device, or vice versa, and the input is to remain the same for a period of time.

28. The method of claim 27, wherein the control signal comprises a bank select signal.

29. A method for reducing power consumed by a device within a system that is used to drive or otherwise control a display, where an output from the device transitions from one output level to another in response to a corresponding input to the device transitioning from one input level to another, the method comprising:
receiving a control signal that specifies when the input to the device is to transition from one input level to another, in response to which the corresponding output of the device will transition from one output level to another, wherein the control signal selects between at least two input levels, wherein the input to the device will transition from one input level to another when a change in the control signal changes which of the at least two input levels is selected, and wherein after the input to the device has transitioned the input to the device will not to transition again for a period of time;
producing, based on the control signal, a pulsed signal having a leading edge that generally coincides with the input to the device transitioning from one input level to another and a trailing edge that occurs a predetermined delay after the leading edge, where the predetermined delay is defined by a delay between the control signal and the delayed version of the control signal;
providing a first bias current level to the device when a change in the control signal changes which of the at least two input levels is selected and thereby specifies that the input to, and the corresponding output from, the device are to transition; and
after providing the first bias current level to the device, before a next change in the control signal, and after the input to and the corresponding output from the device have already transitioned are not to transition again for the period of time, providing a constant intermediate bias current level to the device for a predetermined period of time, and then providing a second current level to the device, the second bias current level being lower than the first bias current level, and the intermediate bias current level being less than the first bias current level and greater than the second bias current level;
wherein timing associated with providing the first and second bias current levels is based on the leading and trailing edges of the pulsed signal.

* * * * *

UNITED STATES PATENT AND TRADEMARK OFFICE
CERTIFICATE OF CORRECTION

| | | |
|---|---|---|
| PATENT NO. | : 8,115,755 B2 | Page 1 of 1 |
| APPLICATION NO. | : 11/609853 | |
| DATED | : February 14, 2012 | |
| INVENTOR(S) | : Chor Yin Chia | |

It is certified that error appears in the above-identified patent and that said Letters Patent is hereby corrected as shown below:

At column 16, lines 55-56, replace "redetermined" with --predetermined--;

At column 16, line 60, after "time" insert --;--.

Signed and Sealed this
Nineteenth Day of June, 2012

David J. Kappos
*Director of the United States Patent and Trademark Office*